Patented July 18, 1950

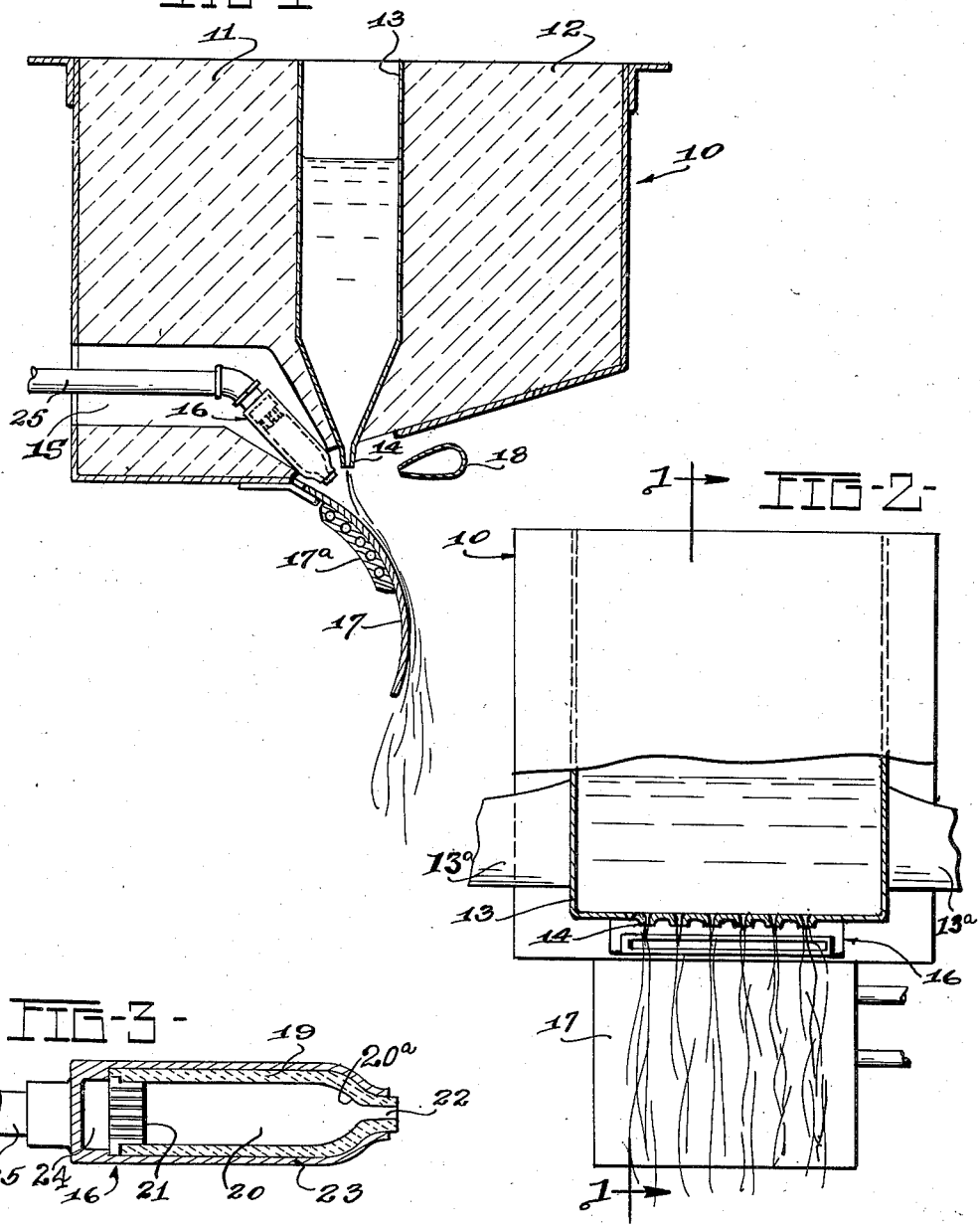

2,515,738

UNITED STATES PATENT OFFICE 2,515,738

APPARATUS FOR PRODUCING GLASS FIBERS

Games Slayter and Ed Fletcher, Newark, Ohio, assignors to Owens-Corning Fiberglas Corporation, Toledo, Ohio, a corporation of Delaware Application September 17, 1945, Serial No. 616,732

6 Claims. (Cl. 49—17)

This invention relates generally to an improved apparatus for manufacturing fibers from thermoplastic materials such, for example, as glass.

One of the principal objects of this invention is to provide an improved apparatus for producing on a commercial scale glass or thermoplastic fibers which may be as small as four hundred-thousandths to ten hundred-thousandths of an inch, or approximately one to two and one-half microns, and even less in diameter. Fibers of this type have many and diversified uses such, for example, as reinforcement for plastics and other material, sewing thread, highly resilient webs, mats and blankets for thermal and acoustical insulation, and for many other purposes where very fine fibers are desired.

Another object of this invention is to provide an apparatus for attenuating molten or semi-fluid glass streams into fine filaments by impinging the streams with a single intensely hot, very high velocity gaseous blast directed over a curved surface whereby the direction of the glass stream is controlled by the contour of the surface. In accordance with this invention, the glass streams are produced by a feeder containing a supply of molten glass and having a plurality of small orifices in the bottom thereof through which glass flows in the form of streams. The streams are attenuated while in a softened condition to the required degree of fineness by a burner supported to one side of the streams in a position to direct an intensely hot, high velocity blast on the streams in the general direction of flow of the latter. The path of the glass streams is controlled by a shield supported on the same side of the streams as the burner and cooperating with the latter to induce an air current along the shield which tends to hold the streams in the blast.

A further object of this invention is to locate the burner in a recess formed in the glass feeder so that the streams are introduced into the blast before they have a chance to become solidified and so that the heat produced by the blast will aid in maintaining the desired temperature of the molten glass in the feeder adjacent the orifices. As a result, uniform flow of the glass through the orifices is facilitated and heat losses are reduced to a minimum.

The foregoing as well as other objects will be made more apparent as this description proceeds, especially when considered in connection with the accompanying drawing, wherein:

Figure 1 is a semidiagrammatic vertical sectional view of apparatus for producing fibers taken substantially along the line 1—1 of Figure 2;

Figure 2 is a front elevation of the construction shown in Figure 1, parts being shown in section; and Figure 3 is a vertical longitudinal sectional view on an enlarged scale through the burner shown in Figure 1.

Referring now more in detail to the drawing, it will be noted that the reference character 10 indicates a feeder comprising a refractory block, preferably formed of two sections 11 and 12 spaced laterally from each other to form a trough therebetween with upwardly divergent side walls. A bushing 13, preferably formed of a high heat resistant material such, for example, as platinum, is supported in the trough between the refractory blocks and is adapted to contain a molten body of material from which fibers are formed. The bushing is electrically connected in circuit for heating with a suitable source of power through terminals 13a formed on the bushing. For the purpose of illustrating this invention, the material may be considered of a thermoplastic nature such, for example, as glass. In accordance with conventional practice, the bottom of the bushing 13 is formed with a plurality of laterally spaced nipples having orifices 14 through which molten glass flows freely in the form of streams.

The refractory section 11 of the block is formed with a recess 15 of sufficient dimension to receive a high velocity burner 16. The burner 16 is positioned in the section 11 of the refractory block to one side of, and immediately adjacent to, the lower end portion of the bushing 13 so that the heat radiated by the burner will aid in maintaining the molten glass in the bushing to the predetermined desired temperature. It will also be noted from Figure 1 of the drawing that the burner is positioned to discharge a blast of gaseous medium against one side only of the streams and in the general direction of flow of the streams. As will be more fully hereinafter described, the burner 16 is of the type which burns a preselected combustible mixture in a confining chamber and discharges the products of combustion at a rate higher than the flame propagation of the mixture in the confining chamber. In this manner, an intensely hot, extremely high velocity blast is discharged against the glass streams issuing from the orifices 14 and, as a result, the glass streams are attenuated into very fine filaments of glass.

The path of the attenuated glass filaments is controlled to some extent by a curved shield 17 which is secured to the section 11 of the refractory block immediately below the burner 16 in a manner to form a baffle at the same side of the streams as the burner. As a result, all of the air induced by the high velocity blast from the burner is caused to flow in from the opposite side of the glass streams and thereby hold the streams inside of the pulling blast where it has its most effective pulling force. Due to the extremely high temperatures in the region of the shield 17, the latter is preferably water cooled and is formed with the usual water jackets 17a for this purpose. If desired, additional means may be provided for insuring movement of the streams issuing from the orifices 14 into the high velocity blast from the burner 16. This means is shown in Figure 1 as comprising a relatively low pressure blower 18 suitably supported adjacent the lower end of the bushing 13 at the side of the streams opposite the burner 16.

Referring now to Figure 3 of the drawing, it will be noted that the burner 16 comprises a body 19 of refractory material having a combustion chamber 20 therein. One end of the combustion chamber 20 terminates at a perforated wall 21 having a plurality of small orifices extending therethrough to provide a screen for the passage of the gaseous mixture into the chamber and the other end of the chamber is provided with a wall 20a having a restricted outlet or discharge passage 22. The refractory body may be surrounded by a sheet metal shell 23 which projects beyond one end of the body to form an inlet chamber 24 communicating with the perforated wall 21. A suitable pipe 25 connects with the shell to feed the combustible gaseous mixture into the inlet chamber 24. During operation, the walls of the chamber 20 are heated by the burning gas and these hot walls tend to increase the rate at which the gaseous mixture entering the chamber burns. The resulting high rate of combustion causes a great expansion of the products of combustion which are accelerated when passing through the outlet 22 so as to provide a very high velocity blast of intense heat.

The type of combustible gas used may be of any suitable nature, but for reasons of economy, is preferably an ordinary fuel gas, such as manufactured or natural fuel gas. This gas is mixed with the proper amount of air by any of the usual types of air and gas mixers not shown herein.

As the operation is initiated, the gaseous mixture is fed into the chamber 20 at velocities somewhat below the rate of flame propagation of the mixture in the atmosphere, but as the temperature of the refractory walls of the chamber increases, the rate of feed of the gaseous mixture into the chamber is increased above this rate. The aim is to feed as much gaseous mixture into the chamber as possible without causing the combustion to become unstable or to take place beyond the chamber or to cease altogether.

The outlet passage 22 of the burner is substantially less in cross sectional area than the chamber 20 so that the products of the combustion formed within the chamber 20 are accelerated as they pass through the restricted outlet. The cross sectional area of the outlet passage may be varied to some extent relative to the cross sectional area of the chamber 20 depending upon the heat required in the blast leaving the outlet passage. Passages of greater cross sectional area relative to the corresponding area of the chamber result in greater heating area for the fibers, but cause a decrease in the velocity of the blast. Thus the relationship between the cross sectional area of the passage and the cross sectional area of the chamber may be varied to obtain the most effective blast for the particular application of the burner. In the present instance, it is preferred to employ a burner having a relatively small discharge orifice so that sufficient velocity is obtained to draw out the streams into extremely fine filaments.

In conclusion, it is pointed out that the process of burning combustible gaseous mixtures results in a blast having a velocity of approximately five hundred to seven hundred feet per second, as against about one hundred fifty feet per second for a mixture of ordinary fuel gas and air burned in the atmosphere. This velocity and the required temperature may be obtained by burning a mixture of fuel gas and air less than five pounds per square inch. The burner is preferably sealed within the refractory to prevent the inspiration of air around the flame or between the flame and the shield.

It will be noted from the foregoing that extremely fine fibers may be commercially produced directly from the feeder with the use of but a single burner. Fibers of the diameter capable of being produced by this apparatus possess properties which enable their use in the production of mats having extremely high acoustic properties. Also the fibers are of sufficient fineness as to enable them to be successfully employed as reinforcements for plastic laminates or other materials. In fact the fibers may be produced in accordance with the present invention at a cost which enables them to be commercially employed in the manufacture of practically any product where fine fibers are desired.

We claim:

1. Apparatus for producing fibers comprising means for flowing a plurality of streams of glass, and a burner positioned alongside and extending in part above the source of said streams and at one side only of the path of travel of the streams to transfer heat to the source of said streams, said burner including a chamber in which a combustible gaseous mixture is burned and having a restricted discharge opening in the burner for discharging the products of combustion at a very high velocity onto the streams in the same general direction as the streams to attenuate the latter into fibers and to induce the flow of gases from the atmosphere at the side of the streams opposite the blower toward the streams to urge the latter into the force of the blast.

2. Apparatus for producing fibers comprising a feeder having a bushing for supplying a plurality of streams of glass and having a recess at one side of the bushing in close proximity to the latter, a burner supported in the recess in heat transferring relation to the source of the streams and having a restricted discharge orifice for the products of combustion, and a curved shield disposed adjacent the burner orifice on the side opposite the side facing the streams of glass and extending from the burner toward the path of the products of combustion, said burner discharging the products of combustion onto one side only of the streams in the general direction of flow of the latter and to induce gases from the atmosphere lying opposite the burner to flow along the shield and maintain the streams within the force of the blast.

3. Apparatus for producing fibers comprising a feeder having a bushing for supplying a plurality of streams of glass from a body thereof, said bushing enclosed in a refractory material having a recess therein at one side of the bushing and in proximity to the source of the streams, a burner supported in said recess with the major portion of its length disposed in the plane of the body of glass to transfer heat to the body of glass at the source of the streams, said burner having a restricted discharge orifice for the products of combustion, a curved shield disposed adjacent the burner orifice on the side opposite the side facing the streams of glass and extending from the burner toward the path of the products of combustion, said burner discharging the products onto one side only of the streams in the general direction of flow of the latter and to induce gases from the atmosphere lying opposite the burner to flow along the shield and maintain the streams within the force of the blast, cooling means for said shield, and means for directing an auxiliary blast against the streams from a point opposite the burner discharge orifice to insure penetration of the streams into the blast.

4. Apparatus for producing fibers comprising a feeder having a bushing containing a body of glass and for supplying a plurality of streams of glass from said body, said bushing being enclosed in a refractory material having a recess therein at one side of the bushing and in proximity to the source of the streams, a burner supported in said recess with the major portion of its length disposed in the plane of the body of glass to transfer heat to the body of glass at the source of the streams, said burner having a restricted discharge orifice for the products of combustion, a curved shield disposed adjacent the burner orifice on the side opposite the side facing the streams of glass and extending from the burner toward the path of the products of combustion, said burner discharging the products onto one side only of the streams in the general direction of flow of the latter and to induce gases from the atmosphere lying opposite the burner to flow along the shield and maintain the streams within the force of the blast, and means for directing an auxiliary blast against the streams from a point opposite the burner discharge orifice to insure penetration of the streams into the blast.

5. Apparatus for producing fibers comprising a feeder having a bushing for supplying a plurality of streams of glass from a body thereof, said bushing enclosed in a refractory material having a recess therein at one side of the bushing and in proximity to the source of the streams, a burner supported in said recess with the major portion of its length disposed in the plane of the body of glass to transfer heat to the source of the streams, said burner having a restricted discharge orifice for the products of combustion, a curved shield disposed adjacent the burner orifice on the side opposite the side facing the streams of glass and extending from the burner toward the path of the products of combustion, said burner discharging the products onto one side only of the streams in the general direction of flow of the latter and to induce gases from the atmosphere lying opposite the burner to flow along the shield and maintain the streams within the force of the blast, and cooling means for said shield.

6. Apparatus for producing fibers comprising a feeder having a bushing for supplying a plurality of streams of glass from a body thereof, said bushing enclosed in a refractory material having a recess therein at one side of the bushing and in proximity to the source of the streams, and a burner supported in said recess with the major portion of its length disposed in the plane of the body of glass to transfer heat to the body of glass at the source of the streams, said burner having a restricted discharge orifice for the products of combustion directed toward the streams in the general direction of flow of the latter to attenuate the streams.

GAMES SLAYTER.
ED FLETCHER.

REFERENCES CITED

The following references are of record in the file of this patent:

UNITED STATES PATENTS

| Number | Name | Date |
|---|---|---|
| 1,008,204 | Seghers | Nov. 7, 1911 |
| 2,018,478 | Whittier | Oct. 22, 1935 |
| 2,189,822 | Thomas et al. | Feb. 13, 1940 |
| 2,207,764 | Soubier | July 16, 1840 |
| 2,227,357 | Martin | Dec. 31, 1940 |
| 2,291,289 | Slayter et al. | July 28, 1942 |
| 2,405,036 | Hoffman | July 30, 1946 |

FOREIGN PATENTS

| Number | Country | Date |
|---|---|---|
| 481,690 | Great Britain | Mar. 16, 1938 |
| 514,243 | Great Britain | Nov. 2, 1939 |